Jan. 27, 1942.  M. O. SCHUR  2,271,099
METHOD OF AND MEANS FOR PROTECTING THE EXPOSED FACES OF
AUTOMOBILE WINDSHIELDS
Filed July 27, 1939
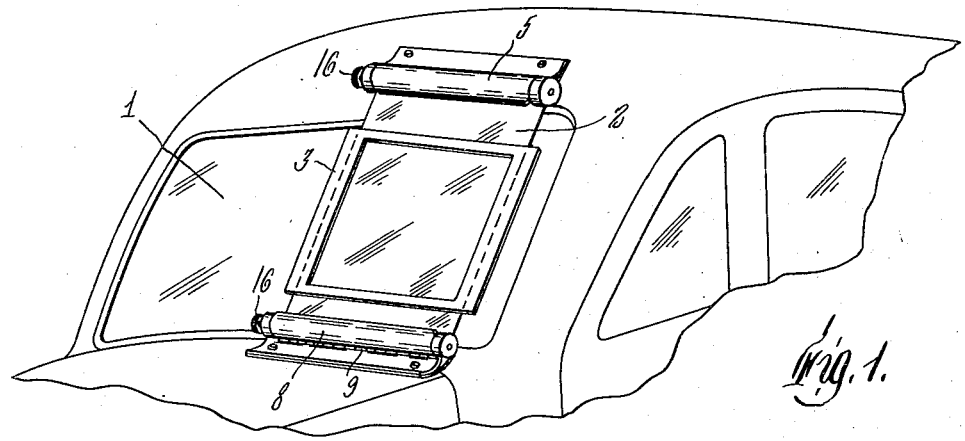
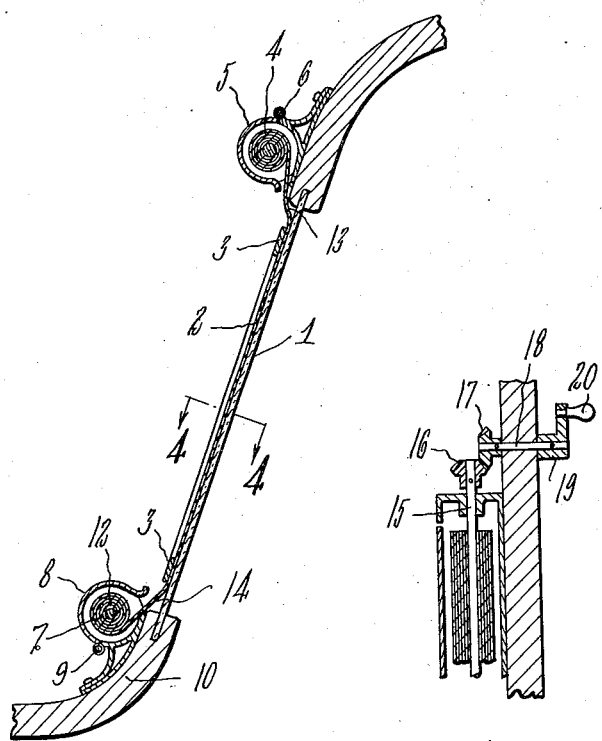
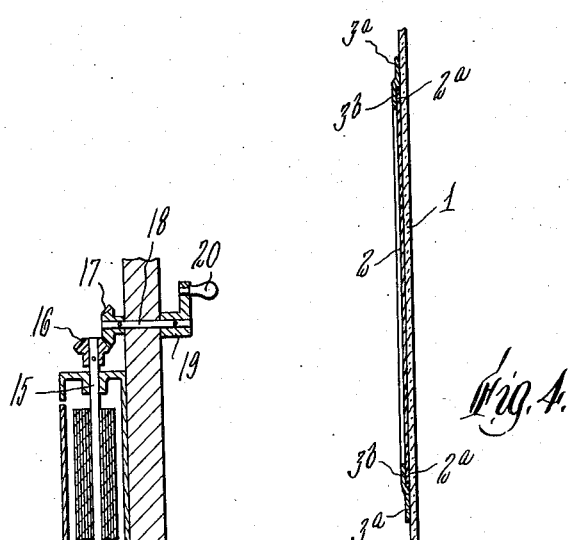
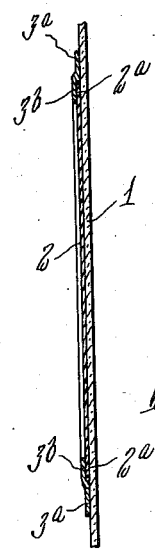
Inventor
Milton O. Schur
by Nathaniel P. Wharton
Atty.

Patented Jan. 27, 1942

2,271,099

UNITED STATES PATENT OFFICE 2,271,099

METHOD OF AND MEANS FOR PROTECTING THE EXPOSED FACES OF AUTOMOBILE WINDSHIELDS

Milton O. Schur, Berlin, N. H.

Application July 27, 1939, Serial No. 286,843

4 Claims. (Cl. 296—84)

This invention relates to a method of keeping clean or protecting against soiling the exposed or outer face of the windshield of an automobile or analogous vehicle and to protective means more especially in the form of transparent liner or film material.

In accordance with the present invention, the outer face or wall of the usual glass windshield of an automobile or analogous vehicle is provided with transparent liner or film material that protects such face or wall against soiling and that, upon itself being soiled, can be readily removed and replaced by fresh or clean similar liner material. The present invention thus eliminates the present troublesome necessity of scouring the glass windshield with soap and water or other detergent followed by careful and thorough wiping. It not only saves considerable time and effort in restoring the desired clear vision through a windshield after the automobile has been driven through a dusty atmosphere or through an atmosphere of winged insects, whose life juices, bodies, or parts become plastered and set as refractory contaminations on the outer windshield surface, but it also enables a removal of sleet or snow from the exposed windshield surface quickly and conveniently.

With the foregoing and other features and objects in view, the present invention will now be described with particular reference to the accompanying drawing, wherein—

Fig. 1 illustrates in perspective an installation embodying the present invention on a front window or windshield of an automobile.

Fig. 2 represents a vertical section through the installation, the windshield, and adjacent automobile body portions.

Fig. 3 is a fragmentary transverse section through an installed supply or accumulator roll for the liner material.

Fig. 4 is a transverse section through the installed liner material and windshield on the line 4—4 of Fig. 2.

The windshield to which the invention hereof is applicable may be of the split or duplex-window type, the window or glass panes being arranged so as to meet angularly at a central ridge, as is conventional in a modern or streamlined automobile; or it may consist of a single window or glass pane arranged vertically or, as appears in Fig. 2, at a suitable inclination. The transparent liner or shielding sheet may, as appears in Fig. 1, be installed so as to protect or overlie only the driver's or left half of the windshield (as viewed from the interior of the car) or, if desired, the entire windshield. Two similar installations of transparent liner material may be made in the case of the usual split or duplex-window windshield, if desired, each installation serving each half or window of the windshield. In any event, the transparent liner material overlies the outer face of the windshield substantially throughout its width, as is shown in the drawing.

As shown in the drawing, 1 is a conventional type of glass windshield over whose left-hand or driver's portion transparent film material 2 is held in place by means of a frame 3 set parallel to the windshield and slightly away from it, excepting at vertical edge portions, as will hereinafter appear. The film material may be fed, as desired, from a roll supply 4 housed in a container 5 hinged at 6 and suitably fastened to the automobile body. A roll accumulator 7 for the film material may be housed in a container 8 hinged at 9 and suitably fastened to the cowl 10. The hinges 6 and 9 permit convenient access to the rolls 4 and 7 when necessary, as for replenishing the supply of film material or for removing the accumulated soiled film material.

The frame 3 at its uppermost and lowermost horizontal edges is spaced slightly from the corresponding edges of the windshield frame so as to define upper and lower horizontal slots 13 and 14, respectively, through which the film material 2 can be threaded from the supply roll 4 to the accumulator roll 7. The vertical outer edge portions 3a of the frame may be secured, as by suitable cement, to the windshield, whereas the vertical inner edge portions 3b may be slightly spaced from the outer windshield surface so as to constitute edge guides or runners which hold the edge portions 2a of the film material against the windshield, thereby preventing such material from flapping in the wind. If desired, the frame 3 may be constructed of transparent material, for example, glass, synthetic resin, or the like.

The shaft 15 of each the lower roll and the upper roll of film material is shown in Fig. 3 as projecting beyond an outer end of the roll container and as carrying affixed thereto a bevel gear 16 meshing with a bevel gear 17 on a shaft 18, which extends into the interior of the car and is there provided with a hand-crank 19 capable of being grasped and rotated by a knob or handle 20. The operation or rotation of the lower roll 7 so as to accumulate contaminated film material and replace it by fresh film material unwound from the upper roll 4 may thus be readily effected by the operator within the car. It is also possible to reroll the film material onto the upper or supply roll 4 by the rotation of such roll in a similar manner inside the car. The film material may then be rewound or again withdrawn from the roll 4 and reused in certain cases, for example, when sleet or snow accumulated on the exposed film material has melted and dripped into the housing 8, as by the heat radiated by the engine or by warm air circulated through such housing. Moisture still clinging to the film material can be swept aside by means of the conventional windshield wiper (not shown).

It is to be understood that the rolls 4 and 7 may interchangeably be either accumulator or supply rolls for the film material and that either of these rolls may be operated or rotated not only by such means as illustrated in Fig. 3 but by such equivalent means as a flexible shaft attached at one end to the shaft of either roll and at the other end to a rotatable knob conveniently accessible to the operator inside of the car. If desired, an end portion of the shaft of either the roll 4 or the roll 7 may be associated with an adjustable brake or friction band or the like (not shown), which may be adjustable by suitable means (not shown) inside the car and through which either roll, as it is being rotated from inside the car, will serve to maintain the desired tension on the film material 2 as it is being withdrawn from one roll and accumulated on the other.

The invention hereof need not necessarily be embodied in an installation involving an accumulator roll for soiled film material and a supply roll for new or clean film material, whereby successive portions of a continuous sheet of film material are made available for protecting or lining the outer windshield surface. Thus, the present invention may involve the use of individual sheets of transparent film material. In such latter case, a sheet of such material may be fastened to the windshield by means of a preferably non-drying and preferably pressure-sensitive adhesive provided at the edge portions of the sheet, which may be supplied either as a pre-cut sheet or may be cut from a roll of the film material coated with suitable adhesive of the character described at its edge portions. When using an individual sheet of transparent film material, the soiled sheet may be peeled off the windshield and replaced with a clean sheet whenever desired or necessary. The choice of suitable transparent film material for the purposes hereof offers considerable latitude. The cheapest transparent film material is "Cellophane" or regenerated cellulose, which is preferably coated with a very thin adherent layer of suitable water-repellent material as in the case of so-called moisture-proof "Cellophane." Among other suitable transparent film materials available for the purposes hereof may be mentioned those composed of cellulose acetate, the cellulose ethers, the vinyl acetate or vinyl chloride polymers, the acrylate polymers, etc. suitably compounded with plasticizers or the like. Thus, film material of ethyl cellulose alone or compounded with blown castor oil can be advantageously used for the purposes hereof. If the soiled film material is to be discarded, the cheapest and thinnest possible film material should be used. If, on the other hand, the film material is to be cleaned or laundered and reused, more durable and heavier film material stock is preferred for the purposes hereof. In any event, the film material is flexible and, relative to the windshield, is very thin. When it is temporarily bonded to the windshield, as at its edge portions, the adhesive or bonding agent used for this purpose is preferably transparent so as not to impair vision through the windshield even at the locally bonded edge-portion areas. Suitably plasticized vinyl ester resin or cellulose acetate typify transparent adhesive or bonding media available for the purposes hereof.

Besides being useful in connection with automobile windshields, the instant invention may be applied to the windshields of such conveyances as aircraft, electric and stream trains, etc. It is to be understood, therefore, that the windshields of such other conveyances are considered to be the equivalents of an automobile windshield and that the expression "automobile windshield" used in the appended claims is to be construed, pursuant to the doctrine of equivalents, as embracing the windshields of such other conveyances. In some instances the film material useful for the purposes hereof may be tinted or colored to the desired shade, for instance, to an amber or blue shade, as when such material is to keep the glare of the sun or of the headlights of an oncoming automobile away from the eyes of the driver of an automobile, the windshield of which is protected externally by such material, accordant with the instant invention. The invention hereof hence makes it unnecessary for the driver to use special anti-glare devices, for instance, to wear sun-glasses to ward off the glare of the sun.

I claim:

1. In an automobile, the combination with a windshield of removable transparent liner material next to the outer face of said windshield, a supply roll of said material, and an accumulator roll of said material, both said rolls being mounted on the body of said automobile adjacent to said windshield with said material extending therebetween and across the outer face of said windshield.

2. In an automobile car, the combination with a windshield of removable transparent liner material next to the outer face of said windshield, a supply roll of said material, an accumulator roll of said material, both said rolls being mounted on the body of said automobile adjacent to the windshield with said material extending therebetween and across the outer face of the windshield, and means located inside the car for rotating at least one of said rolls.

3. In an automobile, the combination with a windshield of removable transparent liner material next to the outer face of said windshield, a supply roll of said material, an accumulator roll of said material, both said rolls being mounted on the body of said autmobile adjacent to opposite edges of the windshield with said material extending therebetween and across the outer face of the windshield, and a frame by which said material is held against said windshield, said frame and windshield defining slots through which said material is passed from said supply roll, thence in between the frame an outer face of said windshield, and thence to said accumulator roll.

4. A method of keeping an automobile windshield clean, which comprises providing transparent film material next to the outer face of said windshield and replacing said material after it has become soiled by similar clean film material.

MILTON O. SCHUR.